(12) United States Patent
Patankar

(10) Patent No.: US 7,188,701 B2
(45) Date of Patent: Mar. 13, 2007

(54) VELOCITY COMPENSATION CONTROL FOR ELECTRIC STEERING SYSTEMS

(75) Inventor: Ravindra P. Patankar, Chassell, MI (US)

(73) Assignee: Delphi Technologies, Inc., Troy, MI (US)

( * ) Notice: Subject to any disclaimer, the term of this patent is extended or adjusted under 35 U.S.C. 154(b) by 334 days.

(21) Appl. No.: 10/165,037

(22) Filed: Jun. 7, 2002

(65) Prior Publication Data

US 2004/0162655 A1    Aug. 19, 2004

Related U.S. Application Data

(60) Provisional application No. 60/297,066, filed on Jun. 8, 2001.

(51) Int. Cl.
B62D 5/04    (2006.01)
B62D 6/10    (2006.01)

(52) U.S. Cl. .................................. 180/446; 701/41

(58) Field of Classification Search ............... 180/443, 180/446, 6.44; 701/41, 42; 318/432, 437, 318/433, 434
See application file for complete search history.

(56) References Cited

U.S. PATENT DOCUMENTS

| | | | |
|---|---|---|---|
| 3,898,544 A | 8/1975 | Tanikoshi | 318/254 |
| 3,919,609 A | 11/1975 | Klautschek et al. | 318/227 |
| 4,027,213 A | 5/1977 | de Valroger | 318/138 |
| 4,135,120 A | 1/1979 | Hoshimi et al. | 318/138 |
| 4,217,508 A | 8/1980 | Uzuka | 310/46 |
| 4,240,020 A | 12/1980 | Okuyama et al. | 318/721 |
| 4,392,094 A | 7/1983 | Kühnlein | 318/254 |
| 4,447,771 A | 5/1984 | Whited | 18/661 |
| 4,511,827 A | 4/1985 | Morinaga et al. | 318/254 |
| 4,556,811 A | 12/1985 | Hendricks | 310/266 |
| 4,558,265 A | 12/1985 | Hayashida et al. | 318/561 |
| 4,633,157 A | 12/1986 | Streater | 318/723 |
| 4,686,437 A | 8/1987 | Langley et al. | 318/254 |
| 4,688,655 A | 8/1987 | Shimizu | 180/79.1 |

(Continued)

FOREIGN PATENT DOCUMENTS

EP    0 681 955    11/1995

(Continued)

OTHER PUBLICATIONS

PCT International Search Report dated Jan. 3, 2003.

*Primary Examiner*—Lesley D. Morris
*Assistant Examiner*—Daniel Yeagley
(74) *Attorney, Agent, or Firm*—Michael D. Smith

(57) ABSTRACT

Disclosed herein is a method as well as a system for controlling an electric power steering system. The method includes: receiving a torque signal from a torque sensor responsive to a torque applied to a handwheel; obtaining a motor velocity signal, the motor velocity signal indicative of a speed of an electric motor which applies torque to a steerable wheel; and generating a command for the electric motor with a controller coupled to the torque sensor, and the electric motor. The command includes torque control and motor velocity compensation, responsive to at least one of the torque signal, and a motor velocity signal. Also disclosed herein is a storage medium encoded with a computer program code for controlling an electric power steering system, the storage medium includes instructions for causing controller to implement the disclosed method.

18 Claims, 9 Drawing Sheets

U.S. PATENT DOCUMENTS

| | | | |
|---|---|---|---|
| 4,745,984 A | 5/1988 | Shimizu | 180/79.1 |
| 4,814,677 A | 3/1989 | Plunkett | 318/254 |
| 4,835,448 A | 5/1989 | Dishner et al. | 318/254 |
| 4,837,692 A | 6/1989 | Shimizu | 364/424.05 |
| 4,868,477 A | 9/1989 | Anderson et al. | 318/696 |
| 4,868,970 A | 9/1989 | Schultz et al. | 29/596 |
| 4,869,335 A | 9/1989 | Takahashi | 180/140 |
| 4,882,524 A | 11/1989 | Lee | 318/254 |
| 4,912,379 A | 3/1990 | Matsuda et al. | 318/254 |
| 4,951,199 A | 8/1990 | Whitehead | 364/424.05 |
| 4,988,273 A | 1/1991 | Faig et al. | 425/145 |
| 4,992,717 A | 2/1991 | Marwin et al. | 318/696 |
| 5,001,637 A | 3/1991 | Shiraishi et al. | 364/424.05 |
| 5,006,774 A | 4/1991 | Rees | 318/721 |
| 5,040,629 A | 8/1991 | Matsuoka et al. | 180/79.1 |
| 5,044,956 A | 9/1991 | Behensky et al. | 434/45 |
| 5,063,011 A | 11/1991 | Rutz et al. | 264/126 |
| 5,069,972 A | 12/1991 | Versic | 428/407 |
| 5,076,381 A | 12/1991 | Daido et al. | 180/79.1 |
| 5,122,719 A | 6/1992 | Bessenyei et al. | 318/629 |
| 5,223,775 A | 6/1993 | Mongeau | 318/432 |
| 5,239,490 A | 8/1993 | Masaki et al. | 364/565 |
| 5,307,892 A | 5/1994 | Phillips | 180/79.1 |
| 5,331,245 A | 7/1994 | Burgbacher et al. | 310/186 |
| 5,338,250 A | 8/1994 | Swilley et al. | 452/136 |
| 5,349,278 A | 9/1994 | Wedeen | 318/632 |
| 5,361,210 A | 11/1994 | Fu | 364/424.05 |
| 5,428,285 A | 6/1995 | Koyama et al. | 318/799 |
| 5,429,548 A | 7/1995 | Long et al. | 452/127 |
| 5,433,541 A | 7/1995 | Hieda et al. | 400/279 |
| 5,444,341 A | 8/1995 | Kneifel, II et al. | 318/432 |
| 5,449,199 A | 9/1995 | Heinrichs et al. | 280/775 |
| 5,460,235 A | 10/1995 | Shimizu | 180/79.1 |
| 5,461,293 A | 10/1995 | Rozman et al. | 318/603 |
| 5,467,275 A | 11/1995 | Takamoto et al. | 364/426.01 |
| 5,469,215 A | 11/1995 | Nashiki | 318/432 |
| 5,475,289 A | 12/1995 | McLaughlin et al. | 318/432 |
| 5,482,129 A | 1/1996 | Shimizu | 180/79.1 |
| 5,493,200 A | 2/1996 | Rozman et al. | 322/10 |
| 5,513,720 A | 5/1996 | Yamamoto et al. | 180/141 |
| 5,517,415 A | 5/1996 | Miller et al. | 364/424.05 |
| 5,554,913 A | 9/1996 | Ohsawa | 318/434 |
| 5,568,389 A | 10/1996 | McLaughlin et al. | 364/424.05 |
| 5,569,994 A | 10/1996 | Taylor et al. | 318/700 |
| 5,579,188 A | 11/1996 | Dunfield et al. | 360/99.08 |
| 5,585,708 A | 12/1996 | Richardson et al. | 318/800 |
| 5,616,999 A | 4/1997 | Matsumura et al. | 318/632 |
| 5,623,409 A | 4/1997 | Miller | 365/424.051 |
| 5,642,044 A | 6/1997 | Weber | 324/207.25 |
| 5,656,911 A | 8/1997 | Nakayama et al. | 318/718 |
| 5,668,721 A | 9/1997 | Chandy | 701/41 |
| 5,668,722 A | 9/1997 | Kaufmann et al. | 701/41 |
| 5,672,944 A | 9/1997 | Gokhale et al. | 318/254 |
| 5,701,065 A | 12/1997 | Ishizaki | 318/701 |
| 5,704,446 A | 1/1998 | Chandy et al. | 180/446 |
| 5,717,590 A | 2/1998 | Mihalko | 364/424.051 |
| 5,719,766 A | 2/1998 | Bolourchi et al. | 364/424.052 |
| 5,739,650 A | 4/1998 | Kimura et al. | 318/254 |
| 5,740,040 A * | 4/1998 | Kifuku et al. | 701/41 |
| 5,743,351 A * | 4/1998 | McLaughlin | 180/446 |
| 5,765,116 A | 6/1998 | Wilson-Jones et al. | 701/41 |
| 5,774,819 A | 6/1998 | Yamamoto et al. | 701/41 |
| 5,777,449 A | 7/1998 | Schlager | 318/459 |
| 5,780,986 A | 7/1998 | Shelton et al. | 318/432 |
| 5,801,504 A | 9/1998 | Endo et al. | 318/434 |
| 5,803,197 A | 9/1998 | Hara et al. | 180/248 |
| 5,811,905 A | 9/1998 | Tang | 310/179 |
| 5,852,355 A | 12/1998 | Turner | 318/701 |
| 5,881,836 A | 3/1999 | Nishimoto et al. | 180/446 |
| 5,890,081 A | 3/1999 | Sasaki | 701/37 |
| 5,898,900 A | 4/1999 | Richter et al. | 455/3.2 |
| 5,913,375 A | 6/1999 | Nishikawa | 180/168 |
| 5,919,241 A | 7/1999 | Bolourchi et al. | 701/41 |
| 5,920,161 A | 7/1999 | Obara et al. | 318/139 |
| 5,929,590 A | 7/1999 | Tang | 318/701 |
| 5,944,761 A * | 8/1999 | Heiberg | 701/13 |
| 5,962,999 A | 10/1999 | Nakamura et al. | 318/432 |
| 5,963,706 A | 10/1999 | Baik | 388/804 |
| 5,977,740 A | 11/1999 | McCann | 318/701 |
| 5,979,587 A | 11/1999 | Liubakka et al. | 180/446 |
| 5,984,042 A | 11/1999 | Nishimoto et al. | 180/446 |
| 5,992,556 A | 11/1999 | Miller | 180/446 |
| 6,002,226 A | 12/1999 | Collier-Hallman et al. | 318/439 |
| 6,002,234 A | 12/1999 | Ohm et al. | 318/729 |
| 6,009,003 A | 12/1999 | Yeo | 363/37 |
| 6,034,460 A | 3/2000 | Tajima et al. | 310/179 |
| 6,034,493 A | 3/2000 | Boyd et al. | 318/254 |
| 6,043,624 A | 3/2000 | Masaki et al. | 318/723 |
| 6,046,560 A * | 4/2000 | Lu et al. | 318/432 |
| 6,049,182 A | 4/2000 | Nakatani et al. | 318/432 |
| 6,055,467 A | 4/2000 | Mehring et al. | 701/23 |
| 6,079,513 A | 6/2000 | Nishizaki et al. | 180/402 |
| 6,107,767 A * | 8/2000 | Lu et al. | 318/561 |
| 6,122,579 A * | 9/2000 | Collier-Hallman et al. | 701/41 |
| 6,129,172 A | 10/2000 | Yoshida et al. | 180/446 |
| 6,154,695 A | 11/2000 | Shimizu et al. | 701/41 |
| 6,161,068 A * | 12/2000 | Kurishige et al. | 701/41 |
| 6,219,604 B1 | 4/2001 | Dilger et al. | 701/41 |
| 6,240,350 B1 | 5/2001 | Endo | 701/41 |
| 6,326,750 B1 * | 12/2001 | Marcinkiewicz | 318/432 |
| 6,381,528 B1 | 4/2002 | Kawada et al. | 701/41 |
| 6,422,335 B1 * | 7/2002 | Miller | 180/446 |
| 6,425,454 B1 | 7/2002 | Chabaan et al. | 180/443 |
| 6,450,287 B1 * | 9/2002 | Kurishige et al. | 180/446 |
| 6,498,409 B1 | 12/2002 | Collier-Hallman et al. | |
| 6,530,269 B1 | 3/2003 | Colosky | |
| 6,588,541 B2 * | 7/2003 | Norman et al. | 180/446 |
| 6,647,329 B2 * | 11/2003 | Kleinau et al. | 701/41 |
| 2002/0017885 A1 | 2/2002 | Endo | 318/432 |
| 2002/0022914 A1 | 2/2002 | Kawada et al. | 701/41 |
| 2004/0189228 A1 * | 9/2004 | Katch et al. | 318/432 |

FOREIGN PATENT DOCUMENTS

| | | |
|---|---|---|
| EP | 1 006 042 | 6/2000 |
| WO | WO 01/12492 | 8/2000 |

* cited by examiner

VELOCITY COMPENSATION CONTROL FOR ELECTRIC STEERING SYSTEMS

CROSS-REFERENCE TO RELATED APPLICATIONS

This application claims the benefit of U.S. provisional application No. 60/297,066, filed Jun. 08, 2001 the contents of which are incorporated by reference herein in their entirety.

BACKGROUND

Existing compensation structures for Electric Power Steering (EPS) systems often use torque loop compensation for an electric motor control system without motor velocity compensation. As shown in FIG. 1, in such an existing EPS system employing voltage mode control, a torque compensator 101 commonly a notch filter is employed in the torque path to provide phase lead to ensure that the system remains stable. Since the motor (46 FIG. 2) is run in voltage (pseudo current) mode, back electromotive force (BEMF) compensation proportional to the measured motor speed is added to the voltage command.

Such an EPS system is disclosed and described in commonly assigned U.S. Pat. No. 5,719,766 to Bolourchi et al. While well suited for its intended purposes, this system may be sensitive to motor velocity disturbances and there is no effective way of rejecting them in present structure because the compensation is in the torque path. The torque compensator 101 depicted in the torque path is used for stability and the high pass gain 104 of the high frequency path is used for torque disturbance rejection. Application of a high frequency path to the torque loop compensation of the EPS system is disclosed and described in commonly assigned U.S. Pat. No. 5,704,446 to Chandy et al. Application of a torque compensator 101 makes the EPS system sensitive to disturbances that include frequency content near the notch frequency. Lower notch frequencies result in greater sensitivity of the control system to the torque disturbances near the notch frequency.

With the aforementioned considerations, it has been difficult to apply a control architecture such as that depicted in FIG. 1 to some vehicles and tune the control system to achieve acceptable performance. Excessive high-pass gains 104 may be needed to improve the disturbance rejection at lower frequencies, which unfortunately, increases high frequency disturbance sensitivity. In fact, there may be instances where high-frequency disturbances may not be completely rejected with any stable tuning employed.

BRIEF SUMMARY

Disclosed herein is a method as well as a system for controlling an electric power steering system. The method includes: receiving a torque signal from a torque sensor disposed in the vehicle steering system responsive to a torque applied to a steering wheel; obtaining a motor velocity signal, the motor velocity signal indicative of a speed of an electric motor disposed in a vehicle steering system to apply torque to a steerable wheel; and generating a command for said electric motor with a controller coupled to the torque sensor, and the electric motor. The command includes torque control and motor velocity compensation, responsive to at least one of the torque signal, and a motor velocity signal.

Also disclosed herein is a storage medium encoded with a machine-readable computer program code for controlling an electric power steering system, the storage medium including instructions for causing controller to implement the disclosed method.

Further disclosed is a computer data signal embodied in a carrier wave for controlling an electric power steering system, the data signal comprising code configured to cause a controller to implement the disclosed method.

Additionally, a method for controlling torque in an electric power steering system is disclosed. The method including: receiving a torque signal responsive to a torque applied to a steering wheel; obtaining a motor velocity; generating commands with a controller for the electric motor, where the commands include torque control and motor velocity compensation, responsive to the torque signal, and the motor velocity. The performance of the torque control is responsive to a torque compensator, a high pass low pass structure, and motor velocity compensation.

DETAILED DESCRIPTION OF AN EXEMPLARY EMBODIMENT

Electric power systems which utilize forward path motor BEMF compensation are more sensitive to motor velocity disturbances. One approach to address and control the ill effects of high frequency disturbances is to eliminate the source of the disturbance. The other approach is to reduce sensitivity of the EPS system to high frequency disturbances by changing the control strategy or architecture. The disclosed embodiments address the latter.

Generally, lower frequency torque compensators e.g., notch filters have to be deeper to provide the same stability margin as a higher frequency torque compensator. It should be appreciated that deeper notch filters (e.g., those exhibiting more gain reduction at the notch frequency) while providing necessary stability degrade the disturbance rejection properties of the system at the notch frequency. Further, it should be recognized that a closed loop system cannot reject disturbances where the gain is very low, as it is at the notch center frequency. Additionally, notch filters that are deeper and are at lower frequencies affect the closed loop response of the system (input impedance) if their gain reduction intrudes on the frequency range of driver inputs (e.g., up to about 3 Hz). The ill effects of the low frequency sensitivity are transmitted to and felt by the driver in the form of disturbances caused by friction in mechanical parts. It should also be evident that the notch frequency cannot be increased indefinitely to address disturbance rejection without consideration maintaining control system stability.

Figure 1:
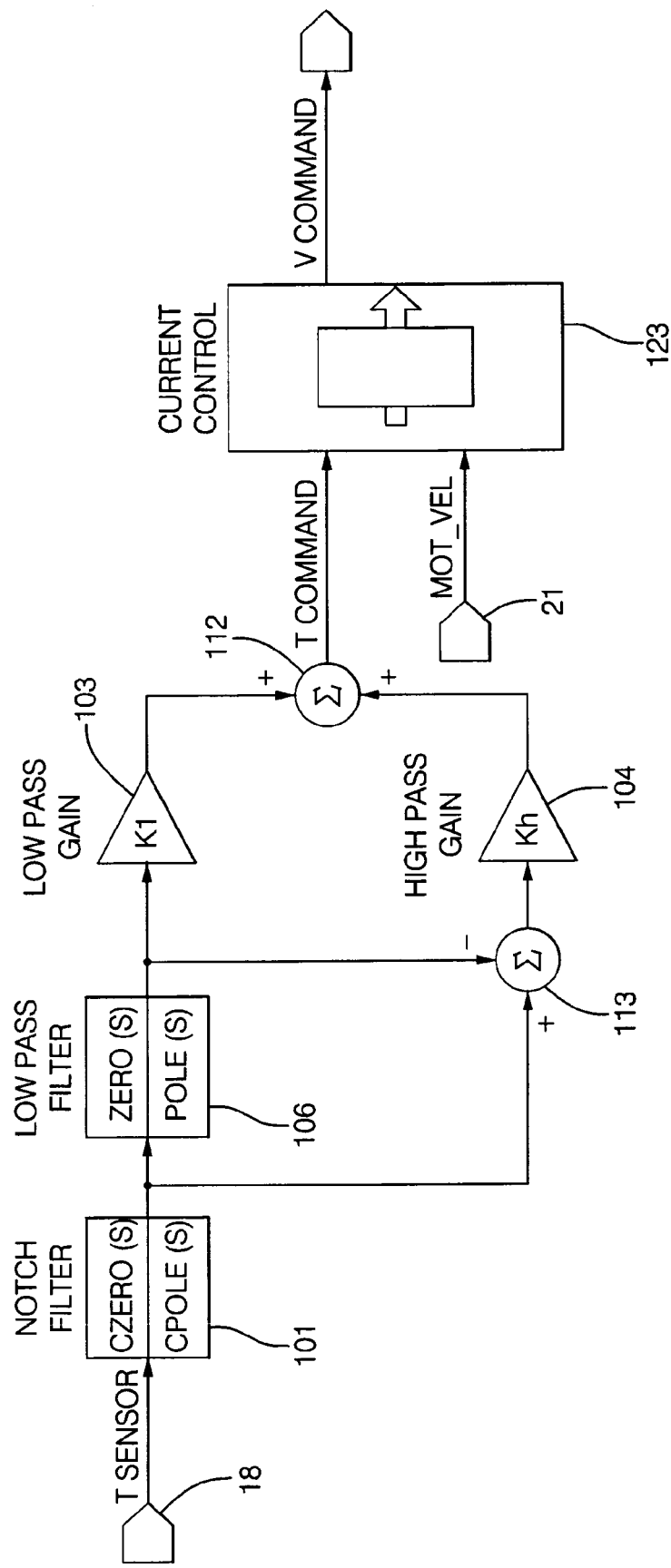
FIG. 1 is a block diagram depicting an existing control system.
Figure 3:
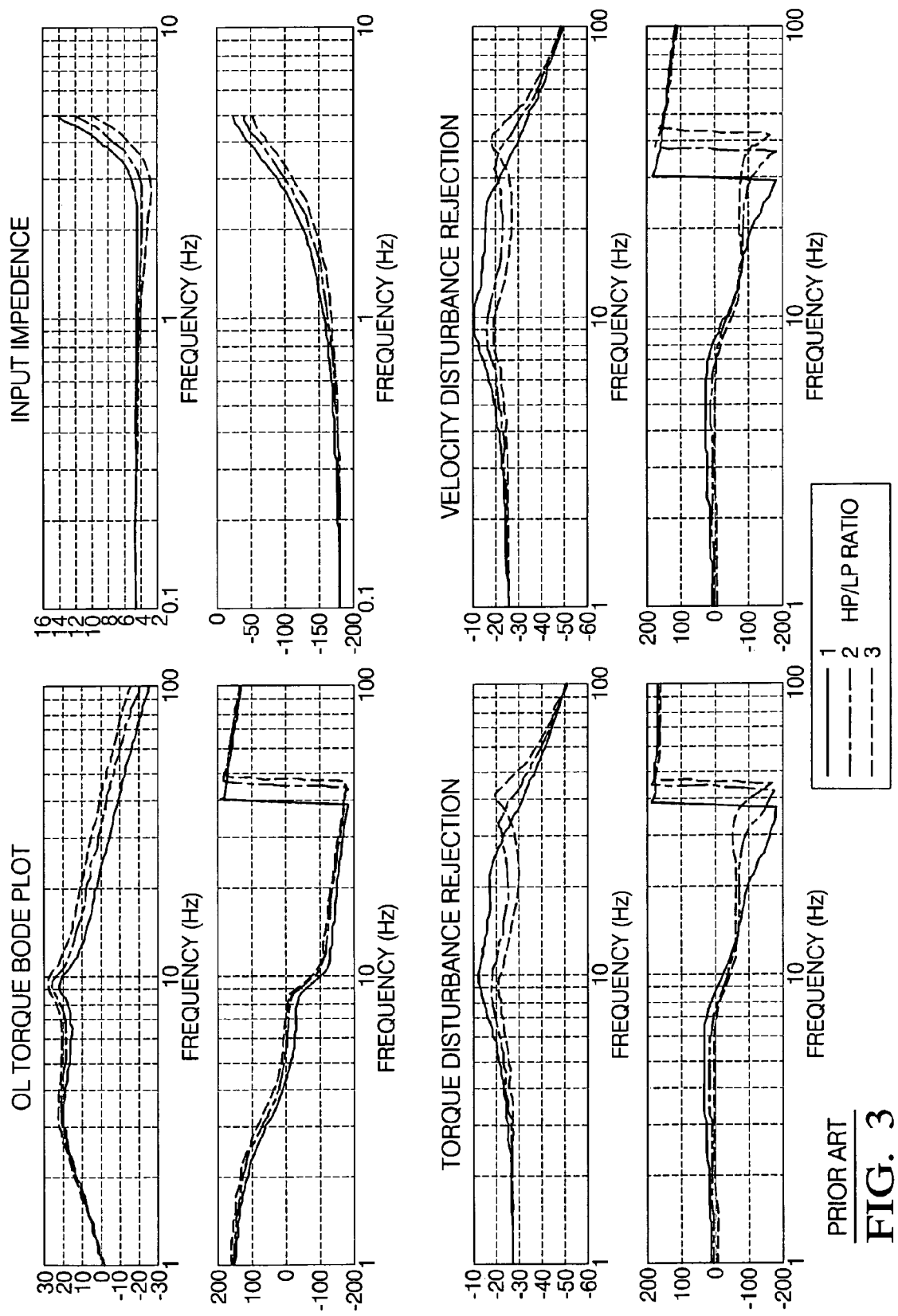
FIG. 3 depicts bode plots of system response for varied high pass gain.

Referring once again to FIG. 1, other design considerations and trade offs may be employed to improve performance characteristics and stability. For example, it may be seen that to achieve improvement in torque disturbance rejection, an increase in high pass gain 104 is required. FIG. 3 depicts performance and stability plots for the control structure depicted in FIG. 1 when the low pass gain 103 is fixed and the high pass gain 104 is varied. Increasing the high pass gain 104 results in a reduction of the control system sensitivity to disturbances at low frequencies. There is, however, a practical limit to such increases in the high pass gain 104. An increase the high-pass gain 104 beyond a certain threshold may also cause instability of the control system. It may be seen from the OL torque bode plot of FIG. 3 that greater high pass gains 104 yield reduced stability margins. The input-impedance plot shows that larger high pass gains 104 cause a reduction in the steering system impedance between 2–3 Hz. The reduction may cause undesirable lightness in the steering for some inputs. Another drawback of increased high-pass gain 104 is that, it causes increased velocity disturbance sensitivity at high frequencies (>20 Hz), as can be seen from velocity and torque disturbance rejection plots of FIG. 3. This characteristic is especially detrimental in the current structure of implementation as depicted in FIG. 1 namely because there is no direct control on velocity disturbance sensitivity.

It's well known in control engineering that negative feedback makes the system more robust to parameter and system variations. In the disclosed embodiments, frequency dependent motor velocity negative feedback is added to the system on top of the existing torque and velocity feedback. This makes the system more robust to parameter variations than a system without frequency dependent motor velocity feedback. Disclosed herein is a motor velocity compensation applicable to the torque compensation of a voltage mode controlled EPS that will allow management of the stability, low frequency disturbance sensitivity, and high frequency disturbance sensitivity trade-offs.

Motor velocity compensation has been employed in existing EPS implementations to facilitate reductions in motor torque ripple and road generated disturbances communicated to the vehicle steering wheel. For example, commonly assigned U.S. Pat. No. 6,122,579 to Collier-Hallman et al. discloses and describes such an EPS system. Disclosed in this patent is a motor control system without back electro motive force (BEMF) compensation based on measured or estimated motor velocity.

An exemplary embodiment of the invention, by way of illustration, is described herein and may be applied to a torque control system for an electric motor in a vehicle steering system. While a preferred embodiment is shown and described, it will be appreciated by those skilled in the art that the invention is not limited to the embodiment described herein, but also to any control system employing an electric machine where voltage mode control is employed.

Figure 2:
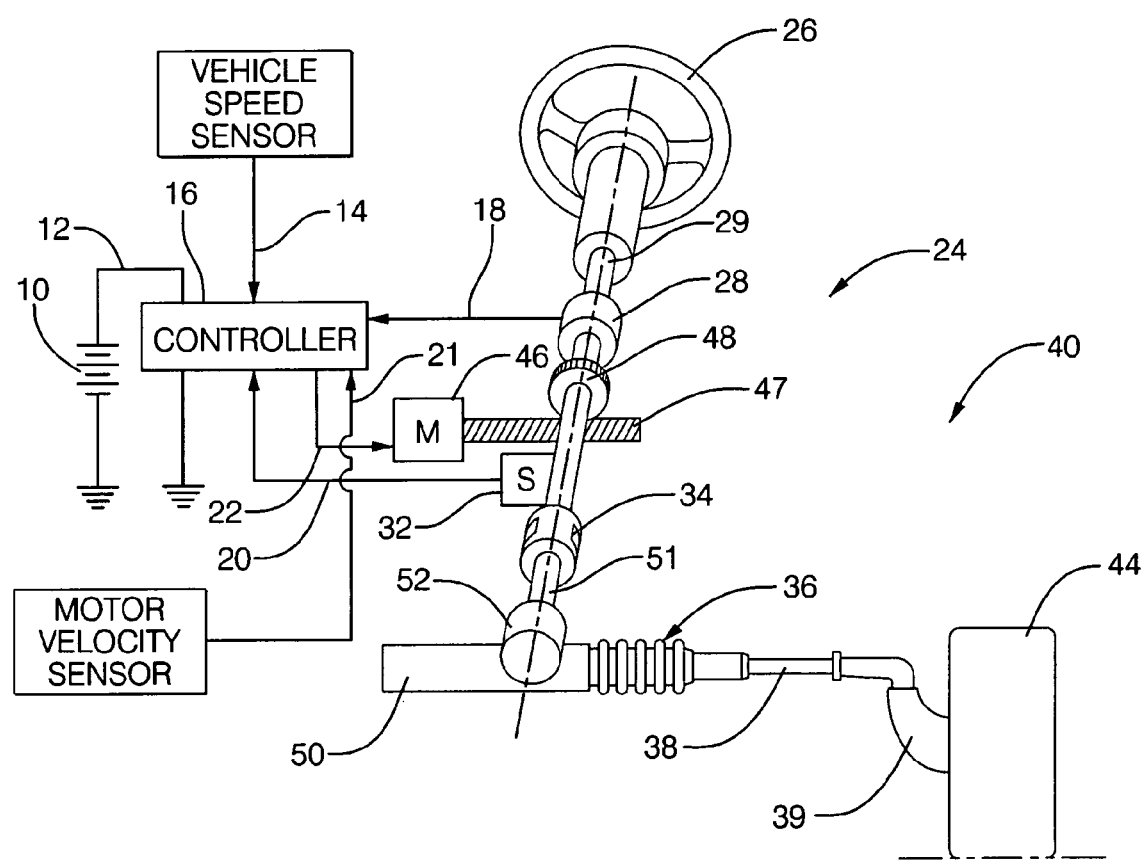
FIG. 2 depicts a vehicle control system for electronic steering.

Referring to FIG. 2, reference numeral 40 generally designates a motor vehicle electric power steering system suitable for implementation of the disclosed embodiments. The steering mechanism 36 is a rack-and-pinion type system and includes a toothed rack (not shown) within housing 50 and a pinion gear (also not shown) located under gear housing 52. As the steering wheel 26 is turned, the steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and the electric motor 46. The controller 16 is powered by the vehicle power supply 10 through line 12. The controller 16 receives a vehicle speed signal 14 representative of the vehicle velocity. Steering pinion gear angle is measured through position sensor 32, which may be an optical encoding type sensor, variable resistance type sensor, or any other suitable type of position sensor, and supplies to the controller 16 a position signal 20. Motor velocity may be measured with a tachometer and transmitted to controller 16 as a motor velocity signal 21. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is the preferable torque sensor, any other suitable torque-sensing device used with known signal processing techniques will suffice.

In response to the various inputs, the controller sends a command 22 to the electric motor 46, which supplies torque assist to the steering system through worm 47 and worm gear 48, providing torque assist to the vehicle steering.

In order to perform the prescribed functions and desired processing, as well as the computations therefore (e.g., the execution of motor control algorithm(s), the control processes prescribed herein, and the like), controller 16 may include, but not be limited to, a processor(s), computer(s), memory, storage, register(s), timing, interrupt(s), communication interfaces, and input/output signal interfaces, as well as combinations comprising at least one of the foregoing. For example, controller 16 may include input signal filtering to enable accurate sampling and conversion or acquisitions of such signals from communications interfaces. Additional features of controller 16 and certain processes therein are thoroughly discussed at a later point herein.

Figure 4:
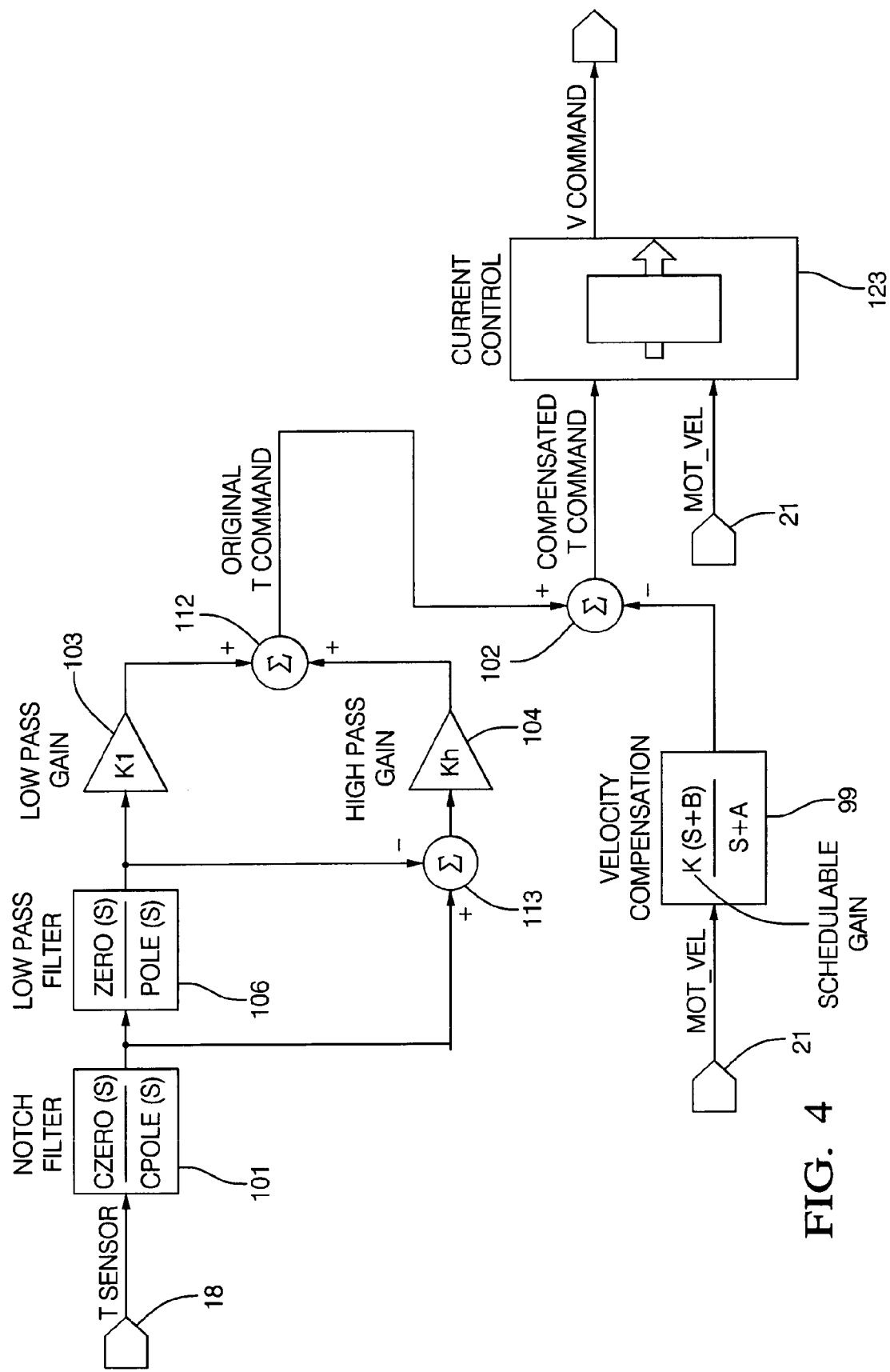
FIG. 4 is a block diagram depicting a control structure with motor velocity compensation.

An exemplary embodiment is presented as a modification to the control process depicted in FIG. 1 and includes motor velocity compensation. The motor velocity compensation may also be considered as a high frequency damping of the torque command in the control system. FIG. 4 depicts an exemplary embodiment of a torque control architecture for controlling a motor, where the original torque command (the output of summer 112) is modified by subtracting a damping function responsive to motor velocity as depicted at summer 102. The high frequency damping is generated by passing the motor velocity through a compensation process depicted at 99. Significantly, this motor velocity compensation 99 exhibits a stabilizing property for the control system 24.

Figure 7:
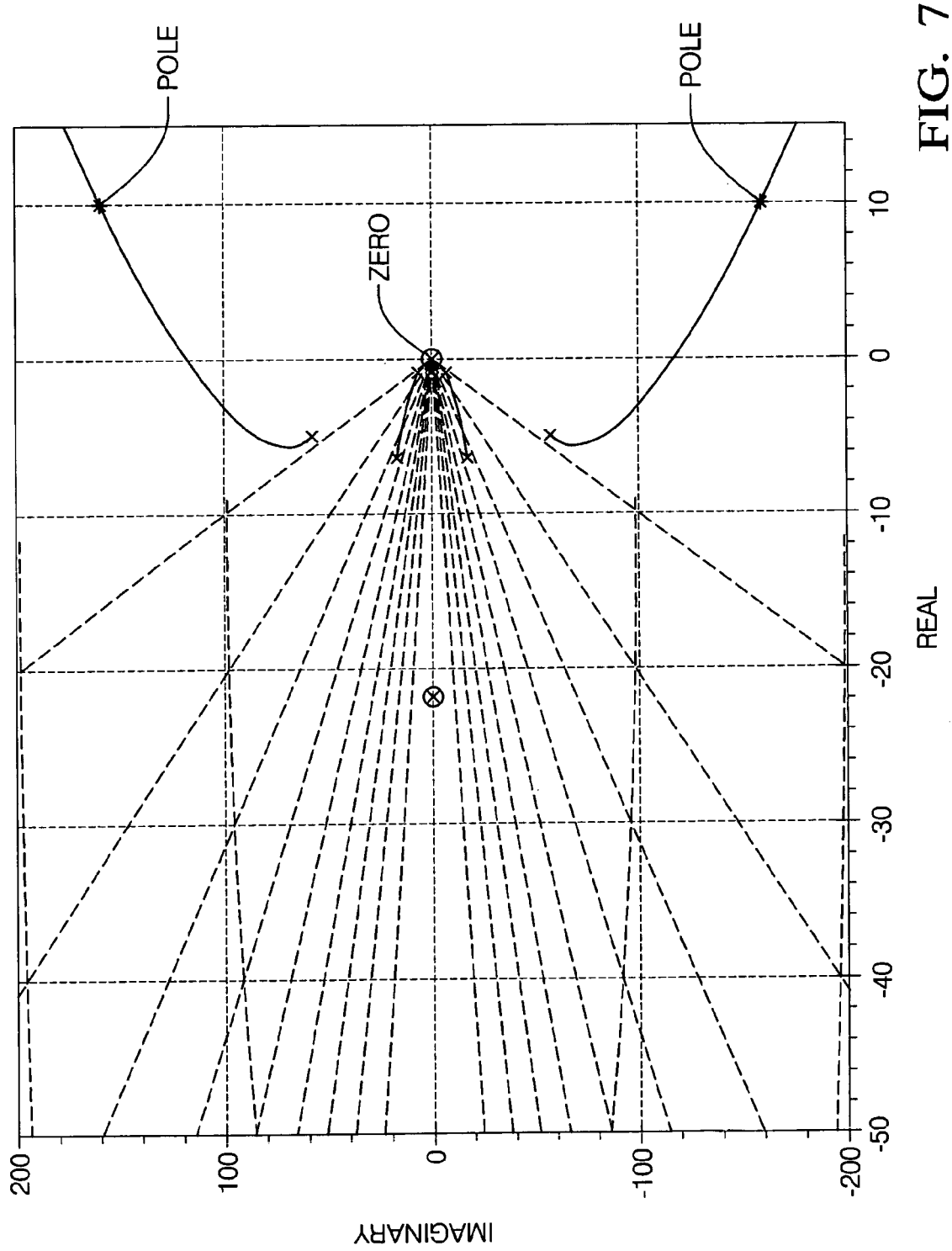
FIG. 7 depicts a root locus plot of an uncompensated system.
Figure 8:
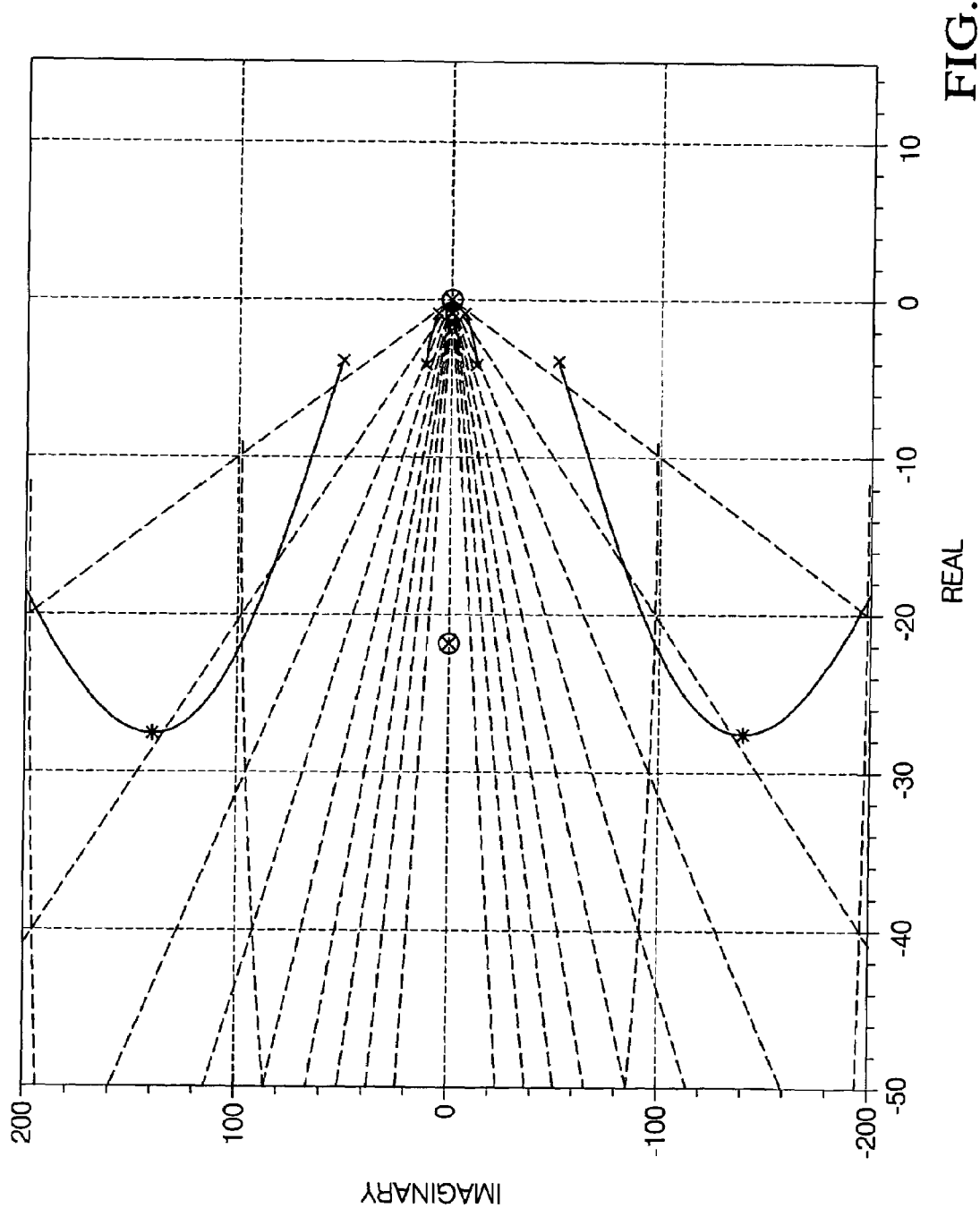
FIG. 8 depicts a root locus plot of a velocity compensated system.

FIG. 7 shows a root locus plot of an uncompensated system e.g., the system 40 depicted in FIG. 4 but without the torque compensator 101 or the motor velocity compensation 99. The '*' in FIG. 7 identifies the closed loop poles of the system at a gain of 22. A filter is employed as a compensator to attract the poles that move into the right half s-plane at high gains. FIG. 8 shows the root locus plot of the system 40 from FIG. 7, but this time including a motor velocity compensation 99 as described in the exemplary embodiment above. In addition, the torque path is left uncompensated for clarity. In an exemplary embodiment, the motor velocity compensation 99 comprises a first order compensator filter with a zero placed at 0 Hz while a pole is placed at 12 Hz. It will be appreciated that while a first order-filter is disclosed for an exemplary embodiment, many other filter orders and topologies are possible. Moreover, it may be desirable to employ varied filter topologies based upon different conditions, system dynamic conditions and considerations, sensor characteristics, implementation constraints, and the like, as well as combinations of the foregoing. For example it may be desireable to employ a higher order filter to ensure that a wide variety of dynamic conditions may be addressed or to address implementation constraints such as commonality of filter topologies or to enable varied filter types in a single topology.

Continuing with FIG. 8, it can be seen from the root locus depicted, that the system is now stable, even at a loop gain of 22 as indicated by the '*' on the plot. Moreover, in some cases it may be possible to fully stabilize the system employing only a motor velocity compensation and no torque compensation, thereby, allowing the elimination of the torque compensator 101 in the torque path. While beneficial and simplifying, this may result in poor input impedance frequency response characterized by undesirable on-center feel. For example, input impedance frequency response that is not substantially flat for low frequencies, e.g., over the operating frequencies of the system 40. In such cases, less aggressive motor velocity compensation 99 that gives a good input impedance response but does not completely stabilize the system may be employed and a shallow torque compensator (e.g., notch filter) 101 utilized in the torque path to completely stabilize the system. In some other cases, especially depending upon other sensor and system dynamic characteristics, the EPS systems may be stable without any motor velocity compensation 99. For example in some systems where derived velocity is employed, no motor velocity compensation 99 is required to stabilize the system. In such cases a torque compensator 101 (e.g.,notch filter) for torque compensation would not at all be needed. Moreover, in these cases, a motor velocity compensation 99 may still be employed.

Figure 5:
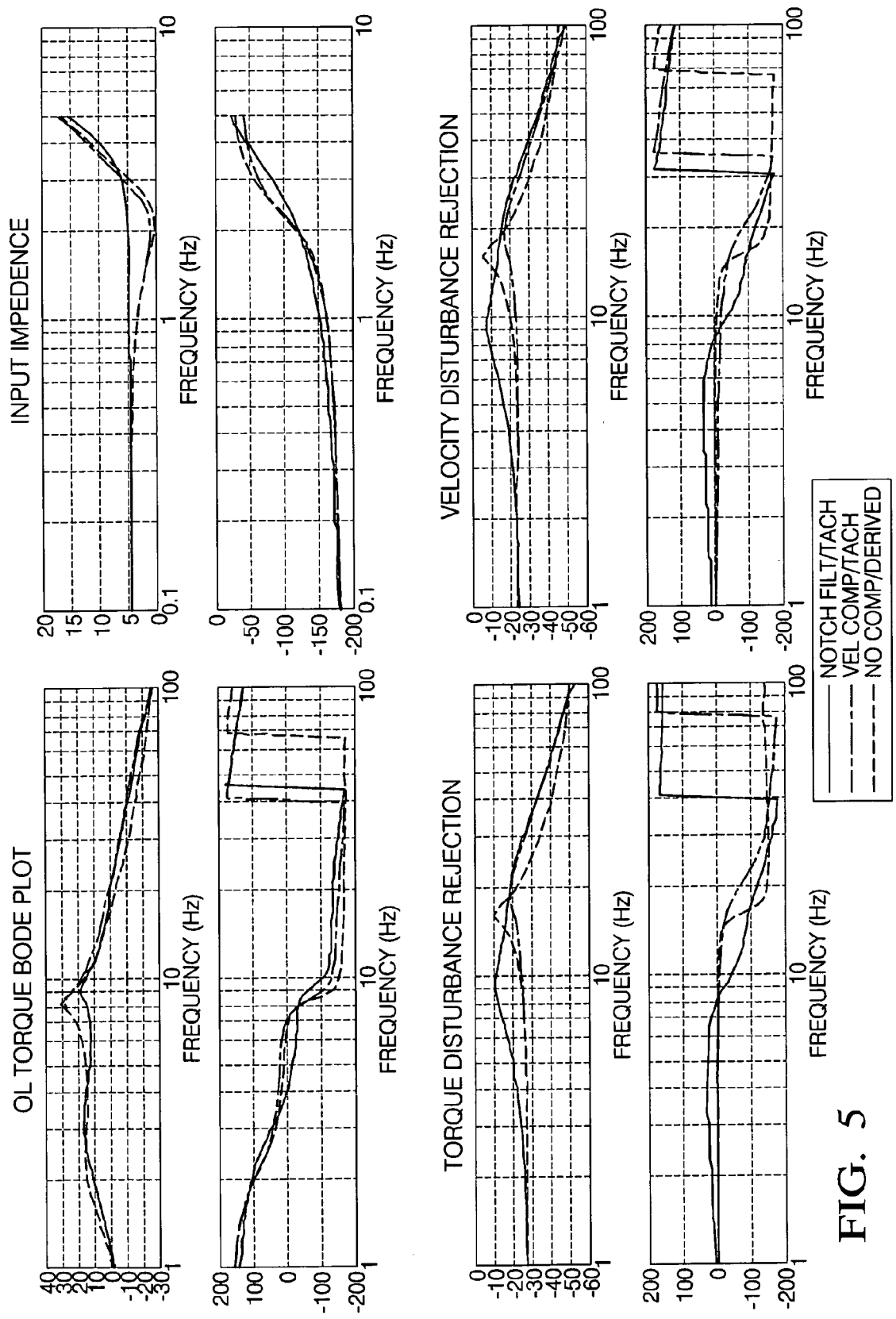
FIG. 5 depicts bode plots of system response for varied system configurations.

FIG. 5 shows performance and stability response plots for three torque control architecture implementations of the exemplary embodiment of FIG. 4 including motor velocity compensation 99. In each case depicted in the figure, the low pass-high pass structure is disabled for clarity. Referring to the figure, the solid line represents a control system employing a torque compensator 101 on the torque path and velocity feedback from a tachometer for damping and back-emf compensation but with no dynamic or motor velocity compensation. The short dashed line represents a system with four state moving average of a velocity derived by differentiating a position sensor and no motor velocity compensation 99 and no torque compensator 101 on the torque path. It is significant to note that, the Open Loop (OL) torque bode plot shows that this derived velocity system topology is stable alone, that is, without any dynamic motor velocity compensation 99 or the torque compensator 101 in the torque path. The long dashed line represents a system employing a tachometer for detecting motor speed with motor velocity compensation 99. The motor velocity compensation 99, in this instance, included, a high pass cut-off frequency of 12 Hz and the zero of the compensation at 0 Hz and no torque compensation (notch filter 101 disabled). It is important to note that the system performance characteristics and stability are impacted by the type of sensor employed as disclosed and discussed earlier.

Continuing with FIG. 5, the input-impedance plot indicates that the tachometer based system with the torque compensator 101 performs well by exhibiting the flatest response. However, the derived velocity system without any dynamic compensation exhibits performance that would be less than desirable. The tachometer based system with motor velocity compensation 99 exhibits performance in between the others. The disturbance rejection plots show significant sensitivity at low frequencies for the tachometer based system with a torque compensator 101 (solid line). The sensitivity plots also show two peaks for this system topology. As seen from FIG. 3, and as discussed earlier, increased high pass gains would reduce the first peak but at the same time increase the second peak frequency and sometimes the magnitude of sensitivity, thus sacrificing high frequency disturbance rejection to reduce the friction bumps. Unfortunately, some tachometer based systems may exhibit a high frequency velocity disturbance source due to unrelated processing. The derived velocity systems (short dashed line) also exhibit a high albiet narrower peak at moderate (10–20 Hz) frequencies. Finally the velocity compensated system (long dashed line) has by far the best disturbance rejection characteristics, e.g., low sensitivity to disturbances at low frequencies as well as high frequencies.

Figure 6:
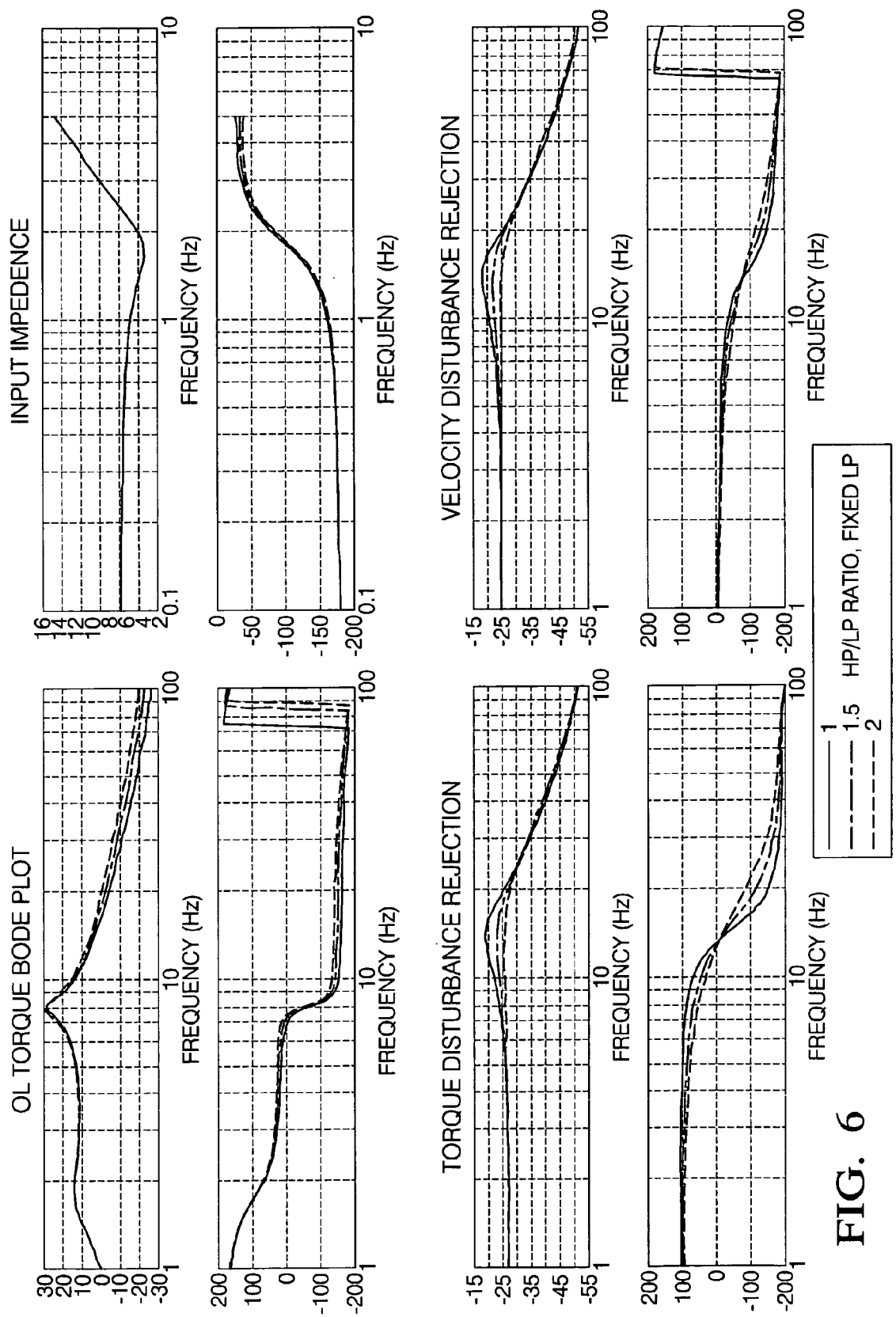
FIG. 6 depicts bode plots of response of a velocity compensated system for varied high pass gain.

It will be appreciated that added stability margin due to the velocity compensation allows the system stability requirements to be met without the traditional torque compensator 101, providing an improvement in torque disturbance rejection and input impedance response characteristics. Returning to FIG. 4, to illustrate the abovementioned enhancement, consideration may now be given to the performance characteristics of a velocity compensated control system including consideration of the effects of the high pass path and varying its gain. FIG. 6 shows the effect of varying the high pass gain 104 on a velocity compensated system without a torque compensator 101. In this example, the motor velocity compensation 99 comprises a pole at 12 Hz and a zero at 0 Hz. Since a torque compensator 101 is not used the disturbance sensitivity due to the torque compensator 101 has vanished and the disturbance rejection plot exhibits only one peak at a high (approximately 15 Hz) frequency. This peak can be directly manipulated by variation of the high pass gain 104. FIG. 6 also shows that increasing the high pass gain 104 lowers the disturbance sensitivity of these systems. Thus, the addition of velocity compensation allows the reduction or elimination of the torque compensator 101 and yet would allow ready management the system trade-offs. In most cases as discussed earlier, the velocity compensated systems disclosed exhibit desirable disturbance rejection properties even when the torque compensator 101 or high pass-low pass structure is disabled.

It will also be appreciated that the gains or scaling may take the form of multipliers, schedulers or lookup tables and the like, which are configured to be dynamic and may also be the function of other parameters. For example, as depicted in FIG. 4, the gain 'k' for the motor velocity compensation or the low pass gain 103, or high pass gain 104 may be variable and a function of other variables (e.g., torque, or motor velocity). Alternatively, it should also be noted, that these kinds of modulations or scheduling may also be performed at a variety of points in the control architecture depicted without diminishing the scope of the disclosed embodiments.

The linear structure of motor velocity compensation 99 as depicted in FIG. 4 is beneficial for analysis and simulation. However, for actual implementation of the exemplary embodiment it may be desireable to make the gain 'k' of the filter schedulable. In an exemplary embodiment, the gain associated with the motor velocity compensation 99 was structured to be scheduled as a function of original torque command, (i.e., the output of summer 112). It is noteworthy to recognize that the design considerations and trade-offs addressed may degrade as the torque loop gain increases. Moreover, as discussed earlier, high gain 'k' for the motor velocity compensation 99 may result in undesirable input impedance frequency response. Input impedance frequency response considerations generally are manifested as low torque command and low torque loop gain properties. Therefore, at a lower torque loop gain a lesser damping value 'k' associated with the motor velocity compensation 99 may be utilized to minimize the impact to the input impedance. Gain scheduling facilitates selective generation of lower damping at low torque commands, and increased damping as required to address stability and disturbance sensitivity. It is noteworthy, however, to recognize that a velocity compensated system could exhibit instability at low gains and low torque commands. To stabilize such a system, as discussed earlier, a benign (low depth) torque compensator 101 (e.g., notch filter) may be included or the low pass-high pass structure as depicted in FIG. 4 with high pass gain 104 higher than low pass gain 103 could be used to provide the phase lead. The phase lead provided by this structure is a function of the cut-off frequency of the low pass filter 106 and also the high pass gain 104 to low pass gain 103 ratio. Higher phase margins may be achieved with increased high pass gain 104 as is evident from the OL torque bode plots. For clarity of the comparison and the effect of increasing high pass gain 104, the gain of motor velocity compensation 99 is maintained constant in all three cases. It is noteworthy to recognize and appreciate that this gain (e.g., for the motor velocity compensation) could be reduced as greater high pass gain 104 is employed without sacrificing stability margins because higher high pass gain provides more phase lead in the torque path.

Therefore, an exemplary procedure for compensation of the system for an arbitrary vehicle employing and EPS with a voltage controlled motor may take the form of the following steps:

1. If possible, stabilize the system with the least possible motor velocity compensation gain 'k' as depicted in FIG. 4 with the torque compensator 101 and the low pass-high pass structure disabled.
2. If the input impedance response of this system is not acceptable, reduce the motor velocity compensation 99 gain at low torque commands using the schedulable gain 'k'.
3. With the reduced motor velocity compensation 99 gain, the system may not be completely stable, especially at low gains. Therefore, the system may be stabilized by adding high pass gain 104 with an appropriate cut-off frequency, and employing an appropriate high pass to low pass gain relation at low gains.
4. If excessive high pass gains 104 are required to stabilize the system at low motor velocity compensation gains and/or if other performance problems result, then a torque compensator 101 may be designed for inclusion in the torque path. Fortunately, the resulting torque compensator 101 will be much lower in depth than that which would have otherwise been necessitated to stabilize the system without any motor velocity compensation 99.

Figure 9:
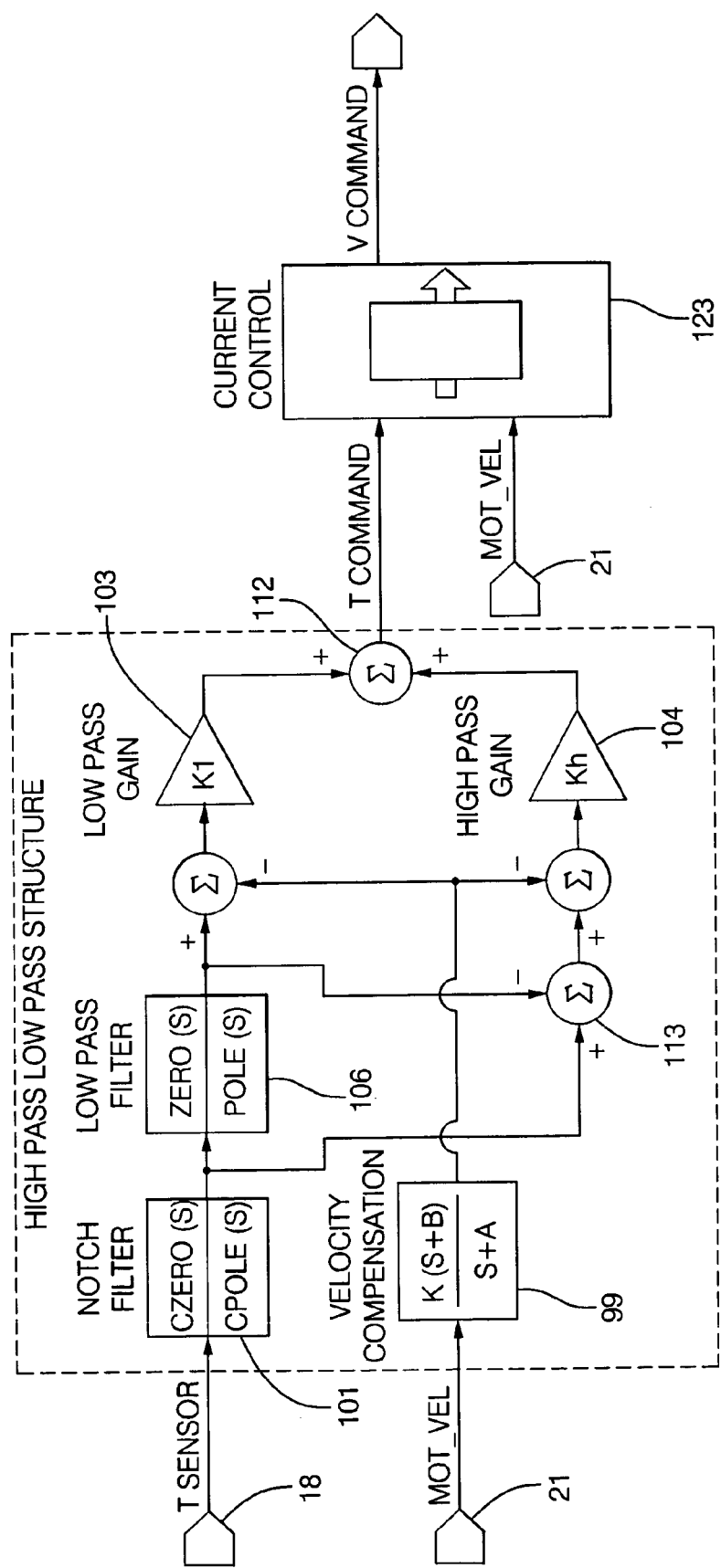
FIG. 9 is a block diagram depicting an alternate control structure with motor velocity compensation.

FIG. 9 depicts an alternate embodiment for the same control system with a different architecture, where a schedulable damping was achieved in a different manner. In such an approach (FIG. 9), the motor velocity compensation 99 is subtracted from the low pass and high pass content of the low pass-high pass structure (outputs of low pass filter 106 and block 113 in FIG. 4), before it passes through the low pass and high pass gain tables (Kl and Kh). Such a structure automatically scales the motor velocity compensation 99 or damping gain with the torque loop gain.

Yet another alternate embodiment includes, motor velocity compensation 99 as in the exemplary embodiment (FIG. 4) or the structure disclosed in FIG. 9, but the torque compensator 101 (e.g., notch filter) (in FIGS. 4 and 9) is applied to the torque command after summer 102 (Tcommand in FIGS. 4 and 9) after the motor velocity compensation 99, instead of before the motor velocity compensation 99 as was previously disclosed. The output of the torque compensator 101 would then be fed to the current control 123 (in FIGS. 4 and 9). This structure or architecture is more robust and efficient in rejecting high frequency disturbances, improves the input impedance to some extent and performs similar to the proposed structure in other performance criteria.

The disclosed method may be embodied in the form of computer-implemented processes and apparatuses for practicing those processes. The method can also be embodied in the form of computer program code containing instructions embodied in tangible media, such as floppy diskettes, CD-ROMs, hard drives, or any other computer-readable storage medium 13, wherein, when the computer program code is loaded into and executed by a computer, e.g. controller 16, the computer becomes an apparatus capable of executing the method. The present method can also be embodied in the form of computer program code, for example, whether stored in a storage medium 13, loaded into and/or executed by a computer, or as data signal 15 transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric power steering control system incorporating motor velocity compensation, said system comprising:

an electric motor disposed in a vehicle for applying torque to a steerable wheel;

a torque sensor disposed in said vehicle for detecting a steering wheel torque and generating a torque signal;

a motor velocity sensor generating a speed signal indicative of a speed of said electric motor; and a controller operably coupled to said torque sensor, said motor velocity sensor, and said electric motor, said controller having a first filter structure and a second filter, said first filter structure filtering said torque signal from said torque sensor to obtain a filtered torque command, said second filter filtering said speed signal from said motor velocity sensor to obtain an output signal, said second filter utilizing a gain value that varies as a function of said filtered torque command, said controller configured to generate a compensated torque command based on said filtered torque signal and said output signal for controlling output torque of said electric motor.

2. The system of claim 1 wherein said output signal is configured to maintain stability of said torque output by said electric motor.

3. The system of claim 1 wherein said output signal is configured to characterize on-center feel of said electric power steering system.

4. The system of claim 1 wherein said second filter comprises at least one zero and at least one pole.

5. The system of claim 4 wherein said at least one pole is placed at about 12 Hertz and said zero is placed at about zero Hertz.

6. The system of claim 1 wherein said first filter structure comprises a frequency based notch filter.

7. The system of claim 1 wherein said first filter structure comprises a high frequency path including a high pass gain and a low frequency path including a low pass gain.

8. The system of claim 7 wherein said high frequency path is configured to control torque disturbance rejection of said electric power steering system.

9. The system of claim 7 wherein said low frequency path is configured to control steady state torque response of said electric power steering system.

10. A method of controlling an electric power steering system, the method comprising:

receiving a torque signal from a torque sensor indicative of a torque applied to a steering wheel;

receiving a motor velocity signal from a motor velocity sensor indicative of a speed of an electric motor; and filtering said torque signal from said torque sensor utilizing a first filter structure to obtain a filtered torque command;

filtering said motor velocity signal from said motor velocity sensor utilizing a second filter to obtain an output signal, said second filter utilizing a gain value that varies as a function of said filtered torque command to obtain said output signal; and generating a compensated torque command utilizing a controller based on said filtered torque signal and said output signal, to control an output torque of said electric motor.

11. The method of claim 10 wherein said output signal is configured to maintain stability of said torque output by said electric motor.

12. The method of claim 10 wherein said output signal is configured to characterize on-center feel of said electric power steering system.

13. The method of claim 10 wherein said second filter comprises at least one zero and at least one pole.

14. The method of claim 13 wherein said at least one pole is placed at 12 Hertz and a said zero is placed at zero Hertz.

15. The method of claim 10 wherein said first filter structure comprises a frequency based notch filter.

16. The method of claim 10 wherein said first filter comprises a high frequency path including a high pass gain and a low frequency path including a low pass gain.

17. The method of claim 16 wherein said high frequency path is configured to control torque disturbance rejection of said electric power steering system.

18. The method of claim 16 wherein said low frequency path is configured to control steady state torque response of said electric power steering system.

* * * * *